United States Patent [19]

Mulach et al.

[11] 4,208,597
[45] Jun. 17, 1980

[54] STATOR CORE COOLING FOR DYNAMOELECTRIC MACHINES

[75] Inventors: Arthur Mulach, Penn Hills; Warren W. Jones, Bullskin Township, Westmoreland County, both of Pa.

[73] Assignee: Westinghouse Electric Corp., Pittsburgh, Pa.

[21] Appl. No.: 917,836

[22] Filed: Jun. 22, 1978

[51] Int. Cl.² .............................................. H02K 9/00
[52] U.S. Cl. .................................... 310/59; 310/260
[58] Field of Search ................ 310/55, 57, 58, 59, 310/60, 64, 65, 256, 260, 270, 53

[56] References Cited

U.S. PATENT DOCUMENTS

| | | | |
|---|---|---|---|
| 2,902,611 | 9/1959 | Rosenberg | 310/64 |
| 3,597,645 | 8/1971 | Duffert | 310/54 |
| 3,619,674 | 11/1971 | Daimo | 310/58 |
| 3,629,629 | 12/1971 | Liebe | 310/59 |
| 3,731,137 | 5/1973 | Harrington | 310/256 |
| 4,088,913 | 5/1978 | Prigovorsky | 310/260 |
| 4,100,439 | 7/1978 | Boer | 310/260 |
| 4,126,799 | 11/1978 | Iogansen | 310/260 |

*Primary Examiner*—R. Skudy
*Attorney, Agent, or Firm*—F. J. Baehr, Jr.

[57] ABSTRACT

Improved cooling is provided for the end regions of the stator core of a large dynamoelectric machine. For this purpose, a solid rigid vent plate is placed in contact with the finger plate at each end of the core. The vent plates are non-magnetic plates of the same configuration as the core laminations and have radial grooves in at least one surface. Coolant gas flows through the grooves to directly cool the finger plate and the end laminations of the stator core.

5 Claims, 5 Drawing Figures

STATOR CORE COOLING FOR DYNAMOELECTRIC MACHINES

BACKGROUND OF THE INVENTION

The present invention relates to cooling the stator cores of large dynamoelectric machines, and more particularly to improved cooling of the end regions of such cores.

Dynamoelectric machines, such as large generators, have stator cores which are built up of laminations in order to reduce the eddy current loss in the core, but substantial hysteresis and eddy current losses occur and the resulting heat must be dissipated to keep the temperature rise within the required limits. This is usually done by dividing the laminations into packs which are spaced apart axially of the core to form radial vents for the circulation of coolant gas through the core.

These radial vents are formed by means of vent plates which are placed at intervals in the laminated core to space adjacent laminations apart and thus to form the vents between packs of tightly-clamped laminations. The conventional vent plates commonly used for this purpose consist of punchings which are identical in configuration to the punchings or laminations of which the core is built and provided with spacing fingers. The fingers are thin sheet metal members extending generally radially of the vent plate and projecting perpendicularly to the plane of the plate. The fingers are typically about 0.125 inch in height and are riveted to the plate. When such a vent plate is incorporated in a stack of laminations, the projecting fingers space the adjacent laminations apart to form a radial duct equal in width to the height of the fingers.

These conventional vent plates operate satisfactorily but involve certain problems due to unavoidable manufacturing variations. The fingers are produced by dies from thin sheet metal and vary slightly in dimensions and shape, and may also show a slight taper from one end to the other. The total thickness of the plate and finger at the points where the fingers are riveted to the plates can also vary from one place to another. These variations are unavoidable and while they are quite small if proper quality control is maintained, nevertheless they are sufficient to cause problems of mechanical stability in some cases and may affect the gas flow through the radial vents.

The problem of cooling the stator core is particularly difficult in the core end regions of large machines such as turbine generators. In large synchronous machines, the currents in the end turn portions of the rotor winding and in the end portions of the stator windings have magnetic fields which combine to produce an axially-directed magnetic flux. This axial flux enters the end of the stator core in a direction generally perpendicular to the core laminations and causes relatively large eddy currents in the end regions of the core since the core is not laminated in a direction to minimize these currents. The corresponding losses may be quite large and often cause excessive heating in the end regions of the core.

When conventional vent plates as described above are used in the end regions of a large stator core, it is not possible to provide radial vents close to the finger plates which clamp the core laminations. The mechanical stability problem discussed above makes it necessary to have a pack of laminations on each side of a conventional vent plate to bridge the spacing fingers. The use of bridging laminations in this way provides sufficient flexibility or resilience in the core, even when the laminations are tightly clamped, to enable the structure to yield enough to distribute the load and thus compensate for the unavoidable small manufacturing variations mentioned above. At each end of the stator core, a solid finger plate bears against the core and is engaged by a clamping plate to apply relatively heavy axial clamping pressure to the entire stack of core laminations. These finger plates and the stator core laminations tend to become quite hot because of the axial flux mentioned above, to which they are exposed, and because of heat conducted from the core itself, and cooling of this region of the stator core has been very difficult. Conventional vent plates cannot be placed directly adjacent the finger plates to provide radial ducts for coolant gas because of the mechanical stability problem discussed above, but must have a pack of laminations of substantial thickness on each side to properly distribute the load. This necessarily spaces the closest radial duct a considerable distance from the finger plate and stator core end laminations so that they are not effectively cooled.

SUMMARY OF THE INVENTION

The present invention provides an improved vent plate which can be used in direct contact with the finger plate at the end of the stator core of a large generator to provide greatly improved cooling and mechanical stability in the core end region.

In accordance with the invention, a rigid vent plate is provided which is preferably made of stainless steel, or other non-magnetic material. The vent plate is of substantially the same configuration as the laminations of the core, but is sufficiently thick to be rigid, and radial grooves are machined in one or both surfaces of the plate to provide radial vent passages for flow of coolant gas. Such a vent plate can be placed directly in contact with the finger plate at the end of the stator core so that gas can flow radially in direct contact with the finger plate or with the stator core end laminations, or both, thus greatly improving the cooling. Conventional vent plates adjacent the ends of the core, if needed, can also be placed directly in contact with the new vent plate, or separated from it a much shorter distance than has previously been necessary, so that an inherently stable mechanical structure is provided with greatly improved cooling. In some cases, the radial grooves may be omitted and the plate used simply as a back-up plate which permits placing a conventional vent plate close enough to the finger plate and end laminations to provide improved cooling without any loss of mechanical stability.

BRIEF DESCRIPTION OF THE DRAWINGS

The invention will be more fully understood from the following detailed description, taken in connection with the accompanying drawings, in which:

As previously indicated, the invention is particularly useful for the stator cores of large dynamoelectric machines, such as turbine generators. FIG. 1 shows a typical construction of such a machine including a gas-tight housing 10 with a laminated stator core 12 supported in the housing. The core 12 carries stator windings 14 of any suitable type disposed in longitudinal slots in the core, and a rotor 16 is supported in bearings in the housing 10 and carries the usual field winding. The machine is cooled by circulation of a coolant gas, usually hydrogen, which is contained in the housing 10 and circulated through the machine in any desired flow path including passages and baffles of any desired arrangement, and including radial ducts provided in the core 12 between packs of laminations as previously described.

Figure 1:
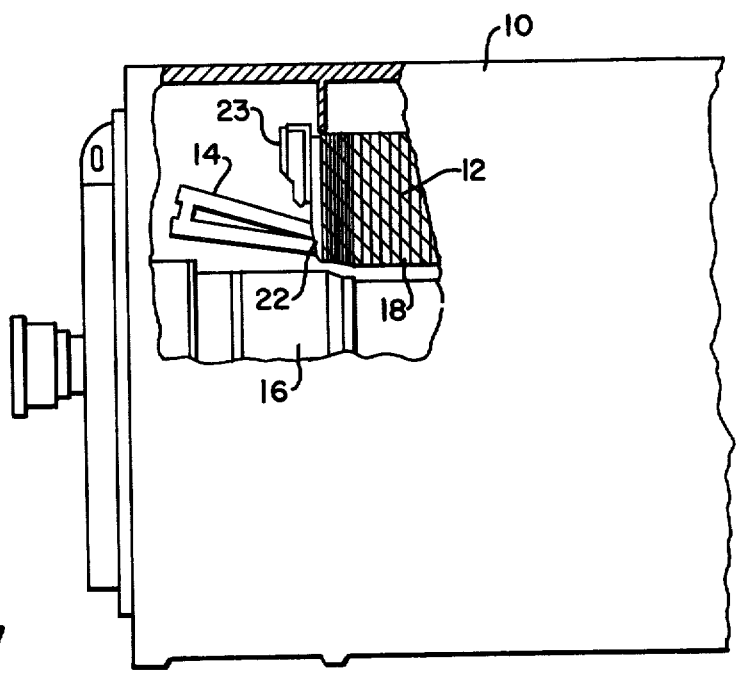
FIG. 1 is a side view, partly broken away, of a large synchronous generator.
Figure 2:
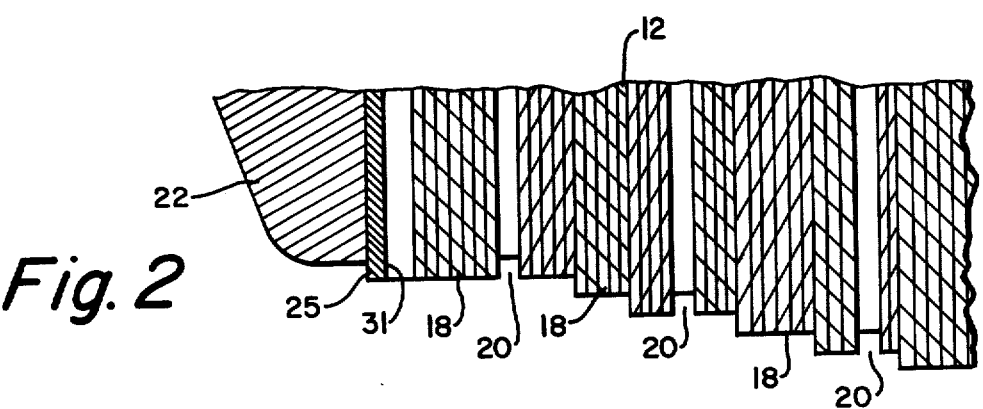
FIG. 2 is a side elevation on an enlarged scale of the end portion of a stator core embodying the invention.

The end portion of the core 12 is shown more in detail in FIG. 2, both ends of the core being of the same construction. As shown, the core is built up of packs 18 of punchings or laminations, the packs 18 being separated by radial vent spaces 20 formed by vent plates of the usual type, as described above; that is, each radial vent 20 is formed by a plate of the same size and configuration as the adjacent laminations with projecting sheet metal fingers attached to it to space the adjacent packs apart. The core 12 is clamped together by clamping means of any suitable type at both ends to clamp the core laminations in a stack under heavy pressure in the usual manner. The clamping means at each end is shown as including a finger plate 22 engaging the end of the core, with means generally indicated at 23 to apply clamping pressure by means of bolts or other suitable means (not shown).

As previously explained, the use of conventional vent plates involves certain mechanical stability problems which can be overcome throughout most of the length of the core by the use of packs of laminations on each side of each vent plate which have sufficient elasticity to yield as required to distribute the load and adjust for minor manufacturing variations. At the ends of the core, however, a conventional vent plate cannot be placed directly in contact with the heavy rigid finger plate, as previously explained, and it has been necessary heretofore to interpose a pack of laminations between the finger plate and the vent plate, thus reducing the cooling available for the finger plate and stator core end laminations since the radial coolant gas flow is spaced a substantial distance away, while the intervening stack of laminations is itself a source of additional heat.

Figure 3:
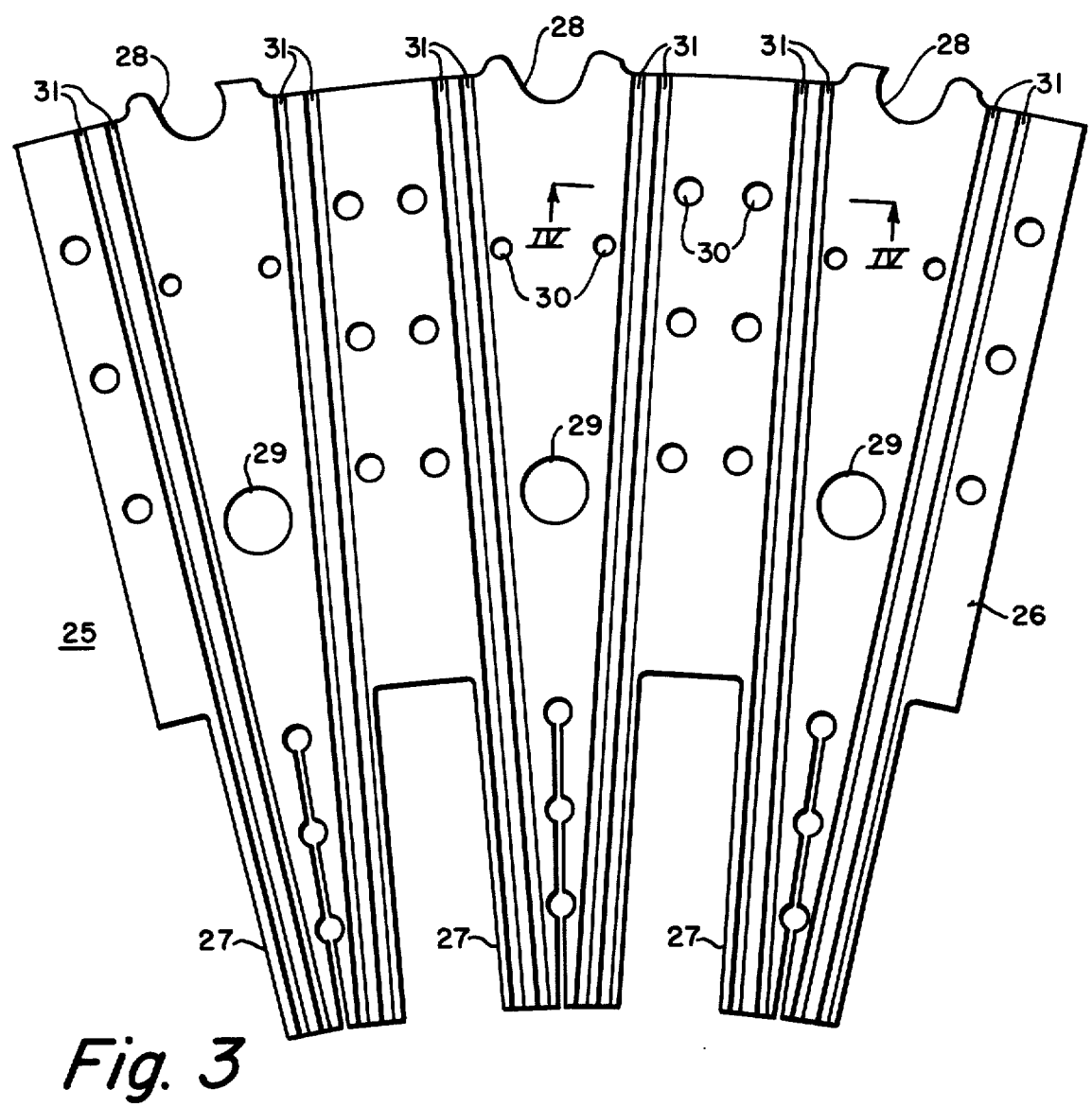
FIG. 3 is a front view of one segment of a segmental vent plate embodying the invention.
Figure 4:
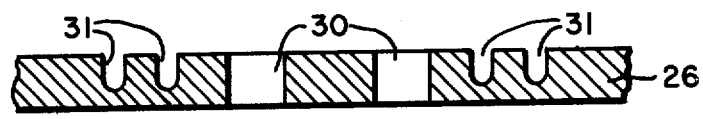
FIG. 4 is a sectional view of the line IV—IV of FIG. 3.

In accordance with the present invention, a vent plate is provided which permits much more effective cooling of the finger plate and the end portion of the core. FIG. 3 shows one segment of a vent plate 25 embodying the invention. It will be understood that in large machines, the annular core punchings or laminations are made up of segments to facilitate handling during manufacture and in building the core, and the vent plate 25 of the present invention is similarly made up of segments, although a complete annular plate could be utilized if the size of the machine permits. The segment 26 shown in FIG. 3 is a rigid non-magnetic plate of sufficient thickness to give it the desired rigidity and mechanical stability, and is preferably made of stainless steel plate about one-quarter inch thick. The segment 26 has the same configuration as the punching segments from which the lamination packs 18 are made, and is shown in FIG. 3 as having three teeth 27 forming slots for stator windings 14, with notches 28 on the outer periphery for reception of the usual core building bolts. Various openings may be provided in the plate 26 as required by the design of a particular machine, including holes 29 for clamping bolts and holes 30 forming part of axial coolant passages. The holes 29 and 30 are, of course, aligned with similar holes in the core punchings to form axial openings extending through the core. In accordance with the invention, vents for radial gas flow are provided by machining grooves 31 in the surface of the plate 26. The grooves 31 may be of any desired size and arrangement, depending on the machine design and the gas flow required, and are shown as extending radially from the outer periphery of the plate 26 to the inner ends of the teeth 27.

The vent plate 25 is built into the core 12 as shown in FIG. 2, being placed at the end of the core in direct contact with the finger plate 22 with the grooved surface adjacent the stator core end laminations. Very effective cooling is thus obtained since coolant gas flows radially through the grooves 31 in direct contact with the end laminations. Very effective cooling is thus provided for the end region of the core and for the clamping means since the finger plate and core are directly cooled by the flow of coolant gas. The complete gas flow path through the machine has not been shown since any suitable or well-known type of ventilation system may be used. If desired, the plate 25 might be positioned with the grooves 31 on the side adjacent the finger plate 22, or grooves 31 might be provided on both sides of the plate 25.

Figure 5:
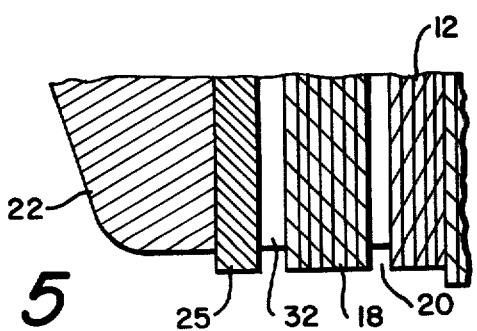
FIG. 5 is a view similar to FIG. 2 showing a modified embodiment of the invention.

It will be seen that the use of a rigid vent plate with machined radial grooves for coolant gas flow has many advantages. The problem of mechanical stability is eliminated and greatly improved cooling of the end portion of a stator core is obtained without requiring any change in the usual coolant flow or the ventilation system of the machine itself. In some cases, this improvement in mechanical stability alone is a sufficient advantage and a plate 25 may be used which has no grooves 31. In this case, the plate 25 is placed adjacent the finger plate 22, as shown in FIG. 5 and a radial vent 32 is provided immediately adjacent the plate 25 by means of a conventional vent plate. The use of the plate 25 as a back-up plate in this way makes it possible to locate the vent 32 close to the finger plate without incurring mechanical stability problems resulting from the unavoidable manufacturing variations in the conventional vent plate.

The use of the rigid vent plate 25 has another advantage in the case of very large machines in which the airgap is divided transversely into zones of different gas pressure by means of annular barriers in the airgap which are supported on the stator. In conventional designs, it ias been difficult to establish the axial location of the last airgap barrier at one end of the core, because of the increased diameter of the bore at the ends of the machine, and special tools have been used to locate the barrier. If a rigid vent plate 25 is used, however, in the position shown in FIG. 2, the plate can be made of smaller inner diameter, corresponding to that of the bore of the machine, and thus the plate itself acts as a locating element for installation of the airgap barrier at that end.

What is claimed is:

1. In a dynamoelectric machine having a laminated stator core with teeth forming longitudinal slots for windings, clamping means at each end of the core for applying clamping pressure thereto, said clamping means including a finger plate, and a vent plate disposed between the finger plate and the core laminations, said vent plate being a rigid, non-magnetic plate of substantially the same configuration as the core laminations, and having radial grooves in at least one surface thereof for flow of coolant gas.

2. The combination defined in claim 1 in which said vent plate is made of stainless steel.

3. The combination defined in claim 1 in which said grooves are formed in the surface of the vent plate adjacent the core laminations.

4. The combination defined in claim 1 in which said vent plates are of segmental construction and have tooth portions corresponding in position to the teeth of the core, and said radial grooves extend from the outer periphery of the plate to the radially inner end of each of the tooth portions.

5. The combination defined in claim 4 in which said core comprises a plurality of packs of laminations, means for spacing adjacent packs of laminations to form radial ducts therebetween, and means for directing coolant gas to flow through said radial grooves and said radial ducts.

* * * * *